United States Patent [19]

Crow

[11] 4,016,655

[45] Apr. 12, 1977

[54] BORING RIG ALIGNMENT APPARATUS AND METHOD

[75] Inventor: Morgan LeVon Crow, Dallas, Tex.

[73] Assignee: Dresser Industries, Inc., Dallas, Tex.

[22] Filed: July 30, 1975

[21] Appl. No.: 600,324

[52] U.S. Cl. .................................. 33/286; 33/1 H; 33/228; 33/309; 356/149

[51] Int. Cl.² ........................................ G01C 15/00

[58] Field of Search ................ 33/275 R, 228, 227, 33/286, 281, 309, 314, 285, 348, 1 H; 178/DIG. 1; 356/172, 149

[56] References Cited

UNITED STATES PATENTS

| 2,517,295 | 8/1950 | Esher | 33/275 R |
|---|---|---|---|
| 3,426,146 | 2/1969 | Seaman | 178/DIG. 1 |
| 3,635,565 | 1/1972 | Colson | 33/228 |

Primary Examiner—William D. Martin, Jr.
Attorney, Agent, or Firm—Michael J. Caddell

[57] ABSTRACT

Methods and apparatus for vertical alignment of a borehole rig directly over a drilling site involve use of a camera placed in parallel orientation to the drilling mast or drill string and sighted in on the drill target, then allowed to swing free to the true-plumb position, thereafter bringing the mast back into parallel orientation with the now-plumb camera.

8 Claims, 2 Drawing Figures

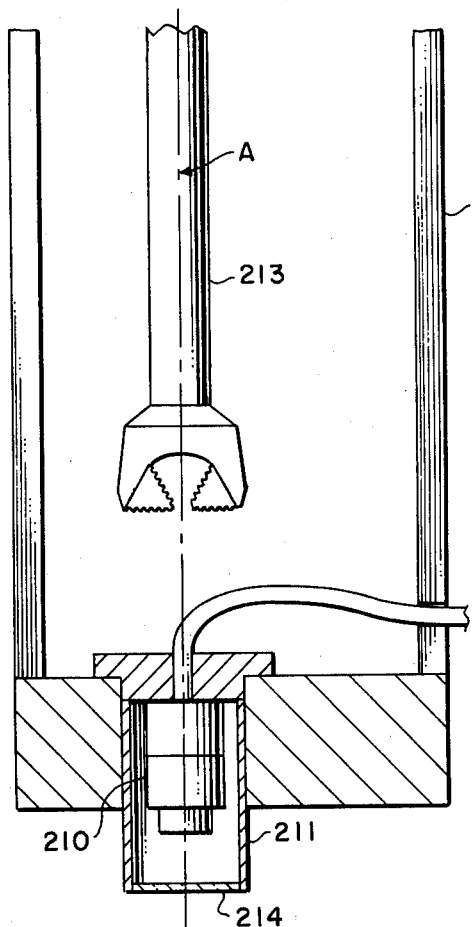
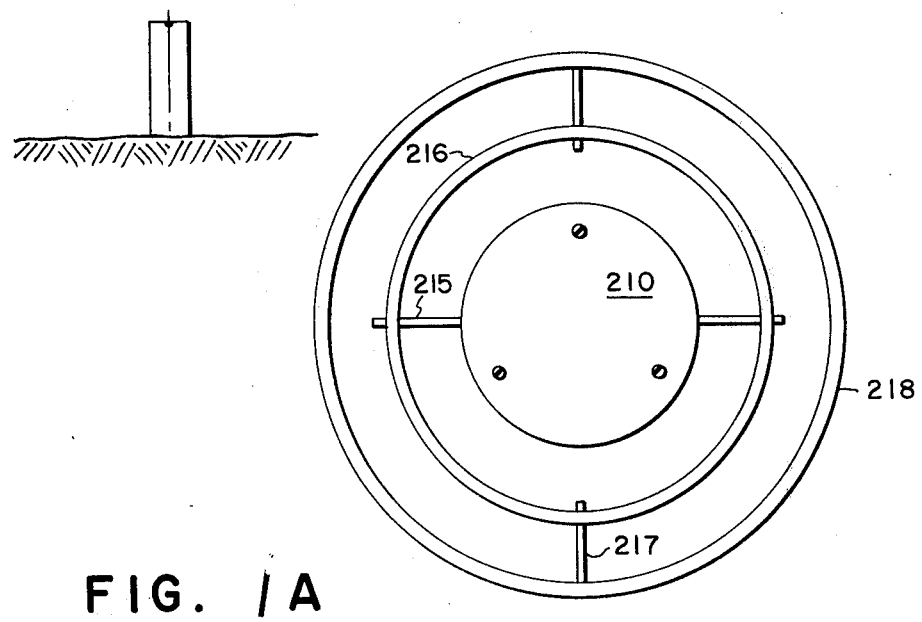
FIG. 1
FIG. 1A

BORING RIG ALIGNMENT APPARATUS AND METHOD

BACKGROUND OF THE INVENTION

In the drilling of boreholes into the earth for certain constructions such as architectural structures and support pilings, it is desirable and often critical that large boreholes be placed in the earth at numerous critical locations within very small tolerances for error, both in the location of the borehole centerline and in the vertical alignment of the borehole centerline.

For example, in the construction of the Alaskan pipeline, much of the actual pipeline will be located above the tundra, supported from vertical pilings which have been sunk through the tundra. The specifications for placing these pilings call for the maximum borehole depth of 50 feet with an error in placing the borehole at the correct surveyed point of less than three inches, and a vertical alignment error of less than three inches in a 50 foot length. Thus, it can be seen that normal boring rigs are incapable of placing such boreholes with such accuracy because of their lack of such sensitive alignment systems.

This invention provides systems and methods for placing the boring rig directly over the survey point in direct vertical alignment thereabove.

BRIEF DESCRIPTION OF THE DRAWINGS

FIG. 1 is a schematic elevational view of a second embodiment of the invention;

FIG. 1a is a top schematic view of a camera mounting system.

DESCRIPTION OF THE PREFERRED EMBODIMENTS

FIGS. 1 and 1a illustrate a rig boring alignment system involving a television camera 210 for placement in the drill string bushing in the mast floor 74. Camera 210 is pivotally mounted in a circular box 211 having external dimensions adapted for relatively close-fitting relationship in the drill string bushing.

Alignment means such as pins or keyways interacting between box 211 and the bushing provide for automatic positioning of the box in proper orientation in the opening. A power conduit 212 leads to camera 210 and carries electric power to the camera as well as carrying the television signal to a monitor (not shown) where the generated signal is converted to a picture.

The alignment of the camera is lockable within the box into a position where the line-of-sight of the camera coincides substantially with the central axis A of the drill string 213. The locking means may be hydraulic, electric, pneumatic, or electromagnetic as is commonly known in the art.

The camera lock may be deactivated to allow the camera to rotate in response to gravitational force acting thereon. The camera is suspended so that its center of gravity lies a measureable distance below the suspension means. Box 211 has a clear bottom plate 214 which is held stationary in the drill pipe opening. A crosshair or bull's-eye target is etched or engraved in the place so that the center of the crosshair lies on axis B. A target spot is also located in the lens of camera 210 so that when the camera is locked into position, the camera spot will intersect the center of the crosshair in plate 214. The camera will then generate a signal showing the spot on the crosshair.

FIG. 1a shows a top view of one possible suspension arrangement for camera 210 in which a gimbal system is used. This comprises a dual axis mounting with the axes at substantially right angles to each other and lying in identical or parallel planes. The camera is rotatably mounted on the primary axis 215 which in turn are set in a ring 216. The ring 216 is rotatably mounted via secondary axis 217 in a stationary ring 218 which is securely mounted in box 211.

In operation, the embodiment of FIG. 1 is placed in the drill pipe opening until the alignment pins or key are properly engaged in the mast floor, indicating the locked camera is sighted along axis B. The boring rig is then moved as close as possible to the proper lateral position over a target stake 220 having a target spot thereon. The camera lock is released, allowing the camera to react to the gravitational force thereon. If the drill string centerline is not perfectly vertical to the earth, the camera will pivot on one or both of its axes and the monitor will show the camera spot misalignment on crosshair plate 214. Subsequent adjustment of the rig mast about the proper axes will move the camera spot toward the crosshair centerpoint until true vertical orientation of the mast is achieved.

The camera spot is then aligned with the target spot on the ground stake by lateral movement of the drilling rig and then the vertical alignment may be rechecked by repeating the procedure. The drilling rig is then ready to begin boring.

Although certain preferred embodiments of the invention have been herein described in order to provide an understanding of the general principles of the invention, it will be appreciated that various changes and innovations can be effected in the described alignment system without departing from these principles. The invention therefore is declared to cover all changes and modifications of the specific example of the invention herein disclosed for purposes of illustration, which do not constitute departures from the spirit and scope of the invention.

The embodiments of the invention in which an exclusive property or privilege is claimed are defined as follows:

1. Apparatus for providing optical alignment of a boring rig over a survey point, comprising:
   housing means containing camera means arranged for sighting along a line coinciding with the drilling axis of a boring rig;
   pivotable suspension means connecting said camera means to said housing means and selectively adapted to allow said camera to swing freely; and,
   target plate means secured to the lower side of said housing means and containing a target arranged to intersect the drilling axis of a boring rig.

2. The apparatus of claim 1 wherein said camera means is a television camera having a lens with a sighting spot and said camera suspension means comprises dual axis gimbal means between said camera and said housing means.

3. The apparatus of claim 1 further comprising locking means and said suspension means adapted to lock said camera in a line of sight coinciding with the drilling axis of a boring rig.

4. The apparatus of claim 1 wherein said housing means comprises a housing adapted for relatively close-fitting engagement in a drill string opening in a drilling mast floor, and having retaining means for maintaining said housing in a preselected position in a mast drill string opening.

5. An optical sighting system for vertical and horizontal alignment of a drilling rig over a survey point, said rig having a vertical mast, a drill string rotatably supported in the mast, and a mast floor with central opening for receiving the drill string; said sighting system comprising:
- a camera housing adapted for relatively close-fitting relationship in a drill string opening;
- a television camera suspended in said housing and directed downward;
- suspension means for rotatably suspending said camera in said housing for multidirectional movement therein;
- said camera arranged to have its center of gravity below said suspension means; and,
- target means in said housing below said camera.

6. The optical sighting system of claim 1 further comprising:
- locking means for locking said television camera in a position whereby the line-of-sight of said camera is downward along the central longitudinal axis of a drill string; and,
- said target means being arranged to center at the intersection of a drill string central longitudinal axis.

7. A method of aligning a vertical drill string and vertical mast over a survey point, said method comprising;
- vertically aligning the drill string with an axis normal to the earth's surface, said aligning step further comprising suspending a television camera below the drill string with a multidirectional pivotal suspension system, with the center of rotation of the camera being on the extended longitudinal axis of the drill string; and,
- adjusting the vertical position of the mast until said camera projects a signal along a line-of-sight coinciding with the central longitudinal axis of the drill string.

8. The method of claim 7 further comprising the step of moving said mast laterally until the line-of-sight of said camera intersects a survey point.

* * * * *

UNITED STATES PATENT OFFICE
CERTIFICATE OF CORRECTION

Patent No. 4,016,655      Dated April 12, 1977

Inventor(s) Morgon LeVon Crow

It is certified that error appears in the above-identified patent and that said Letters Patent are hereby corrected as shown below:

Column 2, line 61, "1" should read -- 2 --.
Column 2, line 66, "1" should read -- 3 --.
Column 3, line 19, "1" should read -- 5 --.

Signed and Sealed this

Twenty-first Day of June 1977

[SEAL]

Attest:

RUTH C. MASON
Attesting Officer

C. MARSHALL DANN
Commissioner of Patents and Trademarks